United States Patent

Nakayoshi

[11] Patent Number: 6,021,996
[45] Date of Patent: Feb. 8, 2000

[54] ELECTROMAGNETICALLY OPERABLE PROPORTIONAL PRESSURE CONTROL VALVE

[75] Inventor: Hideki Nakayoshi, Kariya, Japan

[73] Assignee: Aisin Seiki Kabushiki Kaisha, Aichi-pref, Japan

[21] Appl. No.: 08/347,067

[22] Filed: Nov. 23, 1994

[30] Foreign Application Priority Data

Nov. 26, 1993 [JP] Japan ........................... 5-297110

[51] Int. Cl.$^7$ ................................................ F16K 31/40
[52] U.S. Cl. ................................. 251/30.02; 123/41.49; 251/44; 251/129.08
[58] Field of Search ....................... 251/30.01, 30.02, 251/30.03, 30.04, 30.05, 44, 129.08, 129.15; 123/49.12, 41.49

[56] References Cited

U.S. PATENT DOCUMENTS

| | | | |
|---|---|---|---|
| 4,305,566 | 12/1981 | Grawunde | 251/30.02 |
| 4,494,726 | 1/1985 | Kumar et al. | 251/44 |
| 4,531,707 | 7/1985 | Dotti et al. | 251/44 |
| 4,585,206 | 4/1986 | Itoh | 251/129.08 |
| 4,623,118 | 11/1986 | Kumar | 251/129.08 |
| 4,709,666 | 12/1987 | Merz | 123/41.12 |
| 4,750,704 | 6/1988 | Brundage | 251/30.02 |
| 4,790,511 | 12/1988 | Gehrig et al. | 251/30.02 |
| 4,798,177 | 1/1989 | Oomura et al. | 123/41.12 |
| 4,941,437 | 7/1990 | Suzuki et al. | 123/41.49 |
| 5,020,771 | 6/1991 | Nakatsukasa et al. | 251/30.02 |
| 5,020,772 | 6/1991 | Degenfelder et al. | 251/30.02 |
| 5,048,790 | 9/1991 | Wells | 251/30.04 |
| 5,178,359 | 1/1993 | Stobbs et al. | 251/30.02 |

FOREIGN PATENT DOCUMENTS 5-73955  10/1993  Japan .

Primary Examiner—George L. Walton
Attorney, Agent, or Firm—Hazel & Thomas, P.C.

[57] ABSTRACT

An electromagnetically operable proportional pressure control device has a spool which is slidably housed in a cylindrical bore formed in a housing. A pressure chamber defined in the cylindrical bore communicates with an inlet port through a diametrically reduced bore and an outlet port through a return hole, a pilot valve and a return passage. The pressure difference produced between the inlet port and the pressure chamber causes the spool to move establishing a direct fluid communication of both ports. An oil flow from the inlet port into the pressure chamber is smaller than an oil flow from the pressure chamber to the return passage.

3 Claims, 2 Drawing Sheets

ELECTROMAGNETICALLY OPERABLE PROPORTIONAL PRESSURE CONTROL VALVE

BACKGROUND OF THE INVENTION

The present invention relates to electromagnetically operable proportional pressure control valves and more particularly to proportional pressure control valves each having a spool that is slidable depending upon the magnitude of fluid pressure in a pressure chamber for opening and closing a passage between an inlet and outlet ports of the pressure control valve.

Electromagnetically operable proportional pressure control valves are used in various fields related to automotive vehicles. One example application of this type of valve can be found in an engine cooling system wherein an oil pump is operated by such the valve and is disclosed in a Japanese Patent Publication (KOKOKU) No. 73955/1993. Refer to FIG. 2 to understand the conventional application of such a valve wherein the electromagnetically operable proporitonal pressure control valve 10 is connected in parallel to an oil passage 51 having an oil pump 50 and an oil motor 52 for selectively driving a fan 53 to cool a radiator 54. A working oil discharged from the oil pump 50 flows through the passage 51 when an inlet port 16 of the valve 10 is closed and in passages A, B through the valve 10 when ports 16, 18 open. A signal indicating the water temperature in the radiator 54 is supplied through an electrical cord 55 to ECU 56 which controls the magnitude of electrical current to be supplied to the valve 10 in response to a variation of the water temperature in the radiator 54.

A pressure control valve according to the prior art has inlet and outlet ports, a passage allowing an oil to flow from the inlet port to the outlet port, a control valve for cutting off and establishing fluid communication between both the ports, and an electromagnetically driven pilot valve to regulate the oil pressure in a first oil chamber inside the control valve to displace the control valve in response to variations in the water temperature of a radiator. The control valve is of a frustum of cone and will be subjected to fluctuating forces due to sudden changes in a pressure receiving area on the control valve when energization and disenergization are repeated at a high frequency rate.

In order to diminish the hunting of the control valve due to such fluctuating forces produced in the electromagnetically operable pressure control valve, prior pressure control valves as known in the prior art are provided with a second oil chamber that normally communicates with the first oil chamber through a spill passage.

However, the provision of the second oil chamber and the spill passage causes the valve to be complicated in structure and only offers a reduced damping effect when the oil temperature is varied and a change in the oil flow resistance is found in the spill passage.

It is therefore an object of the present invention to provide an electromagnetically operable proportional pressure control valve having a spool for cutting off and establishing fluid communication between inlet and outlet ports therein.

According to the present invention, there is provided an electromagnetically operable proportional pressure control valve comprising:

valve body means having at least one fluid inlet port and fluid outlet port and a passage for communicating between both the ports;

a spool slidably accommodated in the valve body means for opening and closing the passage between both ports and having a diametrically reduced bore;

plunger means housed in the valve body means to define a pressure chamber and having a pilot valve;

return passage means arranged through the plunger means between the pressure chamber and the outlet port; and electrical means having an electromagnetic coil and a core of magnetic material to generate electromagnetic force for allowing the pilot valve of the plunger means to move.

The above and other features of the present invention will become apparent from the following descriptions of a preferred embodiment taking reference to the accompanying drawings.

DETAILED DESCRIPTION OF THE PREFERRED EMBODIMENT

Figure 1:
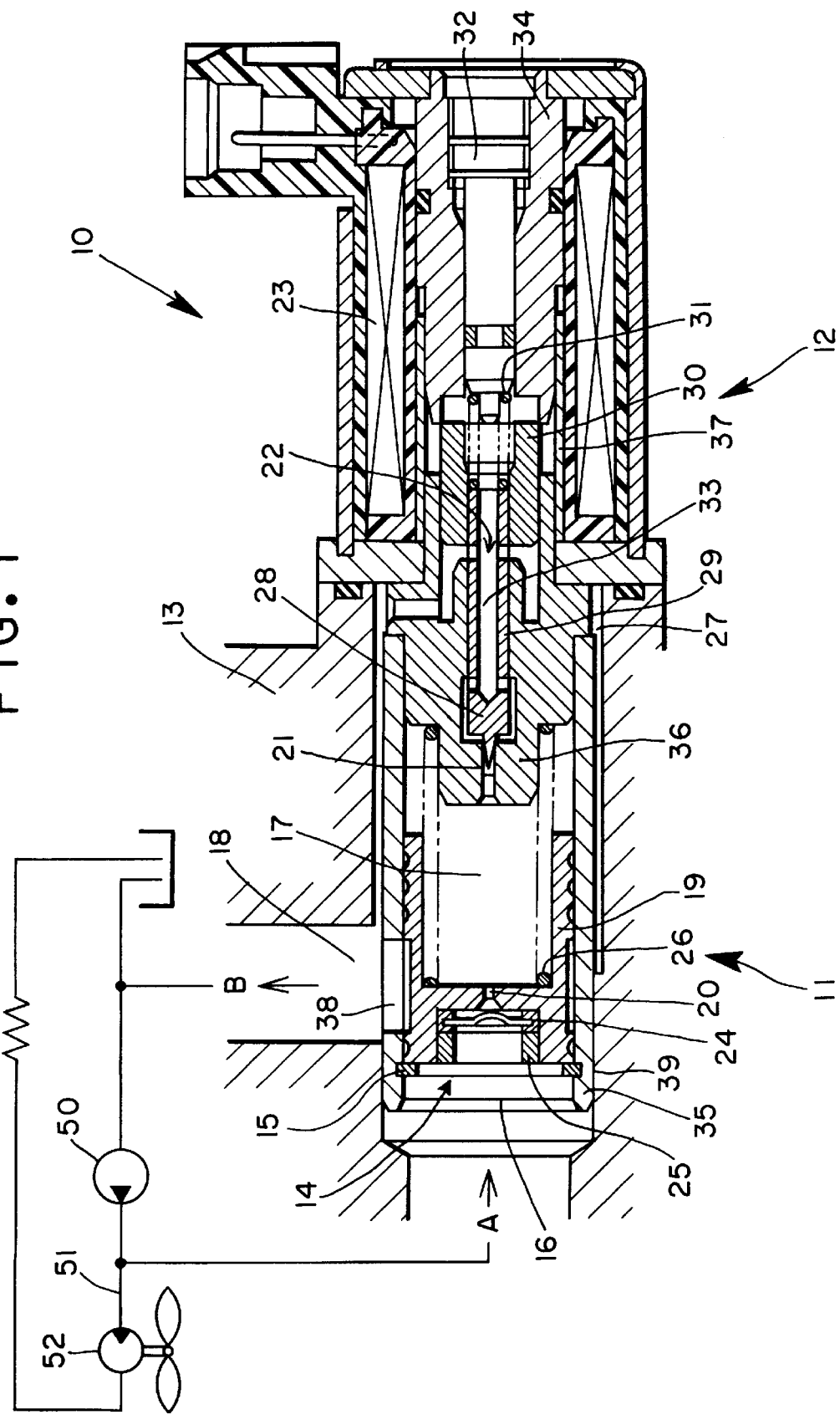
FIG. 1 is a cross-sectional view of an electromagnetically operable proportional pressure control valve according to the present invention.

As shown in FIG. 1, an electromagnetically operable proportional pressure control valve 10 comprises a control valve section 11 and an electromagnetic field section 12 which are assembled as one unit. The pressure control valve 10 has a valve body or housing 13 having an inlet port 16 leading to a discharge side of an oil pump 50 through a line A and an outlet port 18 leading to a suction side of the oil pump 50 through a line B. A hollow sleeve 35 is housed in a cylindrical bore 39 of the valve housing 13 and an oil returning passage 27 is formed between the outer surface of the sleeve 35 and the inner surface of the cylindrical bore 39. The sleeve 35 has an outlet hole 38 opening the outlet port 18 and a spool 19 is slidably accommodated in the sleeve 35. The spool 19 has a diametrically reduced bore 20 and a filter 24 and is urged by a coil return spring 26 in one direction. Numeral 15 denotes a ring for limiting a displaceable range of the spool 19 and 25 denotes a filter supporting element.

Plunger means 22 is provided at the other side of the cylindrical bore 39, which includes a plunger 30 of a magnetic material, a pilot valve 28 fitted with the plunger 30 and having a central passage 33 therein, and a hollow stationary member 36 fixed on the sleeve 35 and having a return hole 21 which is opened or closed by the pilot valve 28 urged by a spring 31. The pilot valve 28 is housed slidably in the central bore of the stationary member 36.

In an interior space 14 formed in the sleeve 35 a pressure chamber 17 is defined by the spool 19 and the stationary member 36. The pressure chamber 17 communicates with the inlet port 16 through the diametrically reduced bore 20 and the return passage 27 through the central passage 33 when the return hole 21 is opened by the pilot valve 28.

An electromagnetic coil 23 is wound around a core 34 of magnetic material to generate an electromagnetic force for allowing the pilot valve 28 to linearly move toward the core 34 in response to energization of the coil 23, so that selective fluid communication between the pressure chamber 17 and the return passage 27 can be established.

Figure 2:
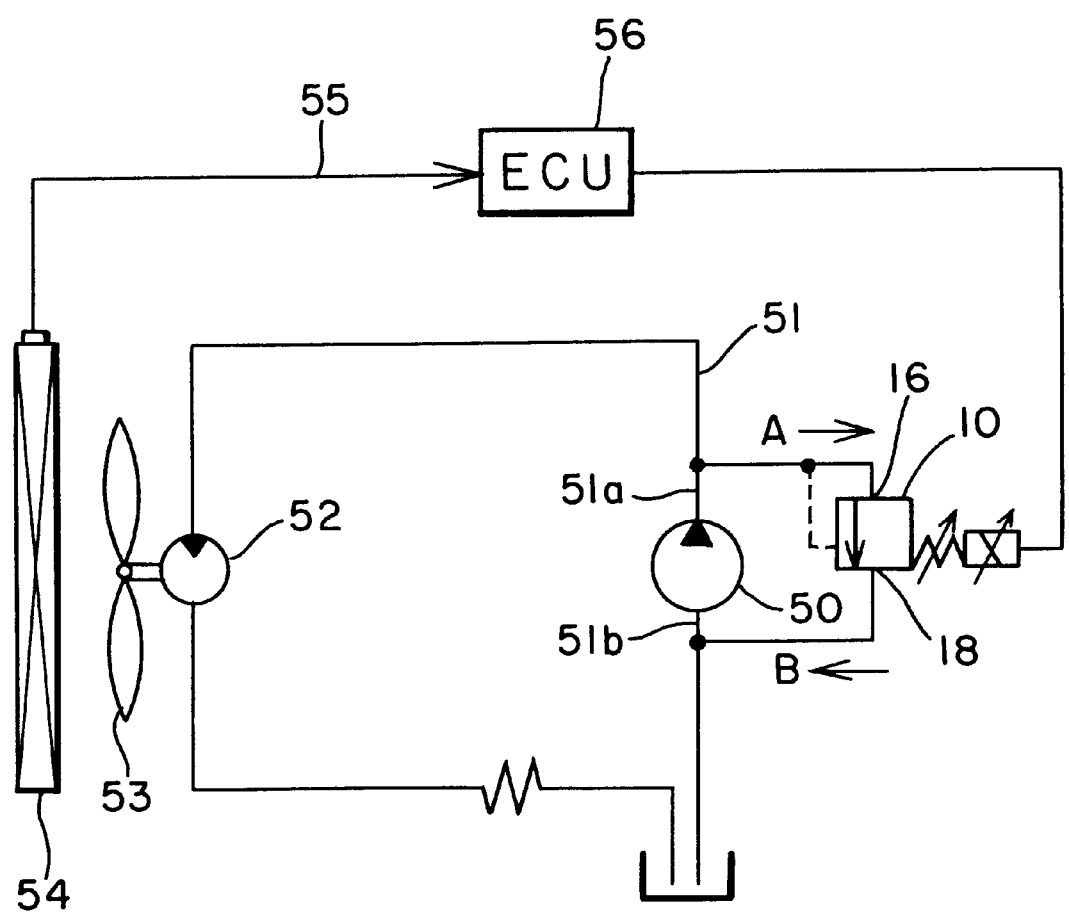
FIG. 2 is a view showing one example of application such the pressure control valve.

When the electrical current flow proportional to the extent of the signal 55 (see FIG. 2) is supplied to the electromagnetic coil 23, the electromagnetic force is produced to displace the pilot valve 28 toward the core 34. When the sum of the electromagnetic force and the magnitude of the oil pressure in the pressure chamber 17 is less than the biasing force of the spring 31, the return hole 21 is closed by the pilot valve 28. When the sum of the pressure in the pressure chamber 17 and the electromagnetic force becomes higher than the biasing force of the spring 31, the pilot valve 28 is displaced rightward (in FIG. 1) to open the return hole 21 so that the pressure chamber 17 communicates with the return passage 27 through the control passage 33 and a pressure difference is produced between the inlet port 16 and the pressure chamber 17 for the reason that an oil flow from the inlet port 16 into the pressure chamber 17 is less than an oil flow from the pressure chamber 17 to the return passage 27. The pressure difference between the inlet port 16 and the pressure chamber 17 causes the spool 19 to move rightward (in FIG. 1) so that the inlet port 16 directly communicates with the outlet port 18. As the result of the direct fluid communication of the inlet port 16 and the outlet port 18, the pressure in the inlet port 16 is reduced and this pressure difference is diminished. When the pressure in the pressure chamber 17 is decreased, the pilot valve 28 is displaced leftward (in FIG. 1) by the biasing force of the spring 31 to close the return hole 21 and the spool 19 is moved leftward (in FIG. 1) by the pressure in the pressure chamber 17 and the return spring 26 to cut off the direct fluid communication of the inlet port 16 and the outlet port 18. Thus, an amount of the working oil discharged from the oil pump 50 is linearly controlled in response to the variation of the temperature of water in the radiator 54 (see FIG. 2).

It is noted that a pressure receiving area of the pilot valve 28 is considerably smaller than that of the spool 19 and hence an attractive force produced by the small magnitude of electrical current enables the pilot valve 28 to move. Further, the fluid communication between both the ports 16, 18 is gradually established so that hunting of the spool 19 is prevented.

What is claimed is:

1. An electromagnetically operable proportional pressure control valve for controlling the discharged pressure of a pump having a discharge side and a suction side, comprising:

a valve body having one fluid inlet port and a corresponding fluid outlet port connected to the discharge side and suction side of the pump, respectively, and a passage communicating between said ports;

a spool slidably accommodated in the valve body and operatively positioned for opening and closing the passage between said ports, said spool having a diametrically reduced bore;

a plunger having a stationary member housed and positioned in the valve body so as to define a pressure chamber, and a pilot valve disposed outside the pressure chamber, wherein said pilot valve is operatively positioned to regulate pressure in the pressure chamber and provided with a central passage defined therein at a first end thereof;

a return passage defined through the plunger between the pressure chamber and the outlet port, said return passage being operatively connected to communicate between the central passage of the pilot valve and the outlet port;

a first spring operatively positioned to urge the pilot valve toward the pressure chamber so as to close fluid communication between the pressure chamber and the return passage through the central passage and a communicating hole defined on the stationary member at a second end thereof;

a second spring operatively positioned between the spool and the stationary member in the pressure chamber so as to close the passage between the inlet port and the outlet port; and electrical means having an electromagnetic coil and a core of magnetic material for generating electromagnetic force to move the pilot valve of the plunger.

2. An electromagnetically operable proportional pressure control valve according to claim 1, wherein the normal communication between the inlet port and the pressure chamber is established by the diametrically reduced bore.

3. An electromagnetically operable proportional pressure control valve according to claim 2, wherein a pressure in the inlet port is exerted on a front constant area of the spool.

\* \* \* \* \*